(12) United States Patent
Ashcroft et al.

(10) Patent No.: US 11,995,864 B2
(45) Date of Patent: May 28, 2024

(54) SYSTEM AND METHOD FOR LOCALISATION USING FOOTPRINTS

(71) Applicant: BAE SYSTEMS plc, London (GB)

(72) Inventors: Jennifer Ashcroft, Rochester (GB); Eddie Jackson, Swindon (GB)

(73) Assignee: BAE SYSTEMS PLC, London (GB)

( * ) Notice: Subject to any disclaimer, the term of this patent is extended or adjusted under 35 U.S.C. 154(b) by 476 days.

(21) Appl. No.: 17/594,781

(22) PCT Filed: Apr. 23, 2020

(86) PCT No.: PCT/GB2020/051005
§ 371 (c)(1),
(2) Date: Oct. 29, 2021

(87) PCT Pub. No.: WO2020/221989
PCT Pub. Date: Nov. 5, 2020

(65) Prior Publication Data
US 2022/0198708 A1    Jun. 23, 2022

(30) Foreign Application Priority Data

Apr. 29, 2019  (EP) ..................................... 19275060
Apr. 29, 2019  (GB) ..................................... 1905945

(51) Int. Cl.
*G06T 7/73*    (2017.01)
*G01C 21/16*   (2006.01)
(Continued)

(52) U.S. Cl.
CPC ............ *G06T 7/73* (2017.01); *G01C 21/1656* (2020.08); *G06T 7/75* (2017.01); *G06V 10/143* (2022.01);
(Continued)

(58) Field of Classification Search
CPC ... G06T 7/73; G06T 7/75; G06T 2207/10048; G06T 2207/30244; G06T 7/80;
(Continued)

(56) References Cited

U.S. PATENT DOCUMENTS

2004/0059264 A1*  3/2004  Nishibe ................ A61B 5/1038
                                               600/592
2019/0060741 A1*  2/2019  Contreras ............... H04S 7/303

FOREIGN PATENT DOCUMENTS

CN    109117882 A    1/2019
KR    101640563 B1   7/2016
(Continued)

OTHER PUBLICATIONS

International Search Report and Written Opinion received for PCT Application No. PCT/GB2020/051005. Mail date: Jul. 17, 2020. 28 pages.

(Continued)

*Primary Examiner* — Molly Wilburn
(74) *Attorney, Agent, or Firm* — Finch & Maloney PLLC (57) ABSTRACT

A system comprises a camera for capturing an image, at least one processor and at least one memory, the at least one memory storing instructions configured to cause the processor to: obtain an image of a scene captured using the camera, the scene comprising a footprint of a user of the system; identify the footprint in the image; identify a first plurality of reference points each having a fixed position relative to the footprint in the image; identify a second plurality of reference points each having a fixed position relative to a three-dimensional model of the user's foot constructed based on at least one known dimension of the user's foot; determine a transformation matrix by mapping the second plurality of reference points of the three-dimensional model to the first plurality of reference points; and determine, based on the transformation matrix, a three-dimensional position (Continued)

of the camera relative to the footprint in the scene at the time of capturing the image.

20 Claims, 8 Drawing Sheets

(51) Int. Cl.
   *G06V 10/143* (2022.01)
   *G06V 20/10* (2022.01)
   *G06V 20/64* (2022.01)
   *G06V 40/10* (2022.01)
(52) U.S. Cl.
   CPC .............. *G06V 20/10* (2022.01); *G06V 20/64* (2022.01); *G06V 40/10* (2022.01); *G06T 2207/10048* (2013.01); *G06T 2207/30244* (2013.01); *G06V 2201/07* (2022.01)
(58) Field of Classification Search
   CPC .. G01C 21/1656; G06V 10/143; G06V 20/10; G06V 20/64; G06V 40/10; G06V 2201/07
   See application file for complete search history.

(56) References Cited

FOREIGN PATENT DOCUMENTS

| WO | 2016035924 A1 | 3/2016 |
| WO | 2020221989 A1 | 11/2020 |

OTHER PUBLICATIONS

GB Search Report under Section 17(5) received for GB Application No. 1905945.0, dated Oct. 15, 2019. 3 pages.
Extended European Search Report received for EP Application No. 19275060.2, dated Oct. 23, 2019. 8 pages.
Lepetit, et al., "EPnP: An Accurate O (n) Solution to the PnP Problem," International Journal of Computer Vision, vol. 81, No. 2. (Jul. 19, 2008), 12 pages.
Huang, et al., "Camera Calibration from Periodic Motion of a Pedestrian," 2016 IEEE Conference on Computer Vision and Pattern Recognition, (Jun. 27, 2016). pp. 3025-3033.
International Preliminary Report on Patentability received for PCT Application No. PCT/GB2020/051005. Mail date: Nov. 11, 2021. 8 pages.

* cited by examiner

SYSTEM AND METHOD FOR LOCALISATION USING FOOTPRINTS

BACKGROUND

The present invention relates to a system and method for localisation in general, and more specifically to a system and method for using a camera to perform three-dimensional localisation.

Localisation in the fields of image sensing and computer vision generally denotes a device's ability to establish its own position and orientation within a frame of reference.

It is well known that the Global Positioning System (GPS) can be used to locate a GPS-enabled device. However, GPS-based localisation systems are undesirable in areas where GPS signals are weak or unavailable. This is particularly the case in enclosed areas, such as indoors and undergrounds, and also in extreme weather conditions. Therefore, it would be beneficial to have a system that is able to perform localisation without using GPS signals.

Image sensing based localisation systems can avoid the need of using GPS signals. However, to achieve three-dimensional localisation, conventional image sensing based localisation systems need to involve stereo vision cameras, in which a pair of cameras are displaced horizontally from one another to obtain two differing views on the scene. The relative depth information can be obtained in the form of a disparity map. It remains challenging to use a monocular camera, i.e. a single camera, to perform three-dimensional localisation.

In image sensing based localisation systems, at least one feature will need to be selected from a surrounding environment to act as a frame of reference, such that the position of camera(s) can be determined relative to the feature. However, it remains challenging to identify a suitable feature to act as a frame of reference in a variety of environments, as most features are not present in a wide range of environments. There remains a need for a system and method which can use the same feature in a variety of environments as a frame of reference for localisation.

Accordingly, one object of the present invention is to overcome the problems of the conventional localisation systems and methods. The embodiments described below are not limited to implementations which solve any or all of the disadvantages of known localisation systems and methods.

SUMMARY OF THE INVENTION

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to a first aspect, there is provided a system, comprising: a camera for capturing an image, at least one processor and at least one memory, the at least one memory storing instructions configured to cause the processor to: obtain an image of a scene captured using the camera, the scene comprising a footprint of a user of the system; identify the footprint in the image; identify a first plurality of reference points each having a fixed position relative to the footprint in the image; identify a second plurality of reference points each having a fixed position relative to a three-dimensional model of the user's foot constructed based on at least one known dimension of the user's foot; determine a transformation matrix by mapping the second plurality of reference points of the three-dimensional model to the first plurality of reference points; and determine, based on the transformation matrix, a three-dimensional position of the camera relative to the footprint in the scene at the time of capturing the image.

Preferably, the at least one memory stores instructions configured to cause the processor to determine a three-dimensional orientation of the camera relative to the footprint in the scene at the time of capturing the image.

Preferably, said image of the scene is a first image of the scene captured at a first point in time, said transformation matrix is a first transformation matrix, and the at least one memory stores instructions configured to further cause the processor to: obtain a second image of the scene captured using the camera at a second point in time; identify the footprint in the second image; identify a third plurality of reference points each having a fixed position relative to the footprint in the second image; identify a fourth plurality of reference points each having a fixed position relative to the three-dimensional model of the user's foot constructed based on the at least one known dimension of the user's foot; and determine a second transformation matrix by mapping the fourth plurality of reference points of the three-dimensional model to the third plurality of reference points on the plane of the second image.

Preferably, the three-dimensional position of the camera is a first three-dimensional position of the camera relative to the footprint in the scene at the first point in time, and the at least one memory stores instructions configured to further cause the processor to: determine an inter-frame transformation matrix based on the first transformation matrix and the second transformation matrix, and based on the inter-frame transformation matrix and the first three-dimensional position of the camera relative to the footprint in the scene, a second three-dimensional position of the camera relative to the footprint in the scene at the second point in time.

Preferably, the at least one memory stores instructions configured to further cause the processor to calculate an updated real-world location of the camera based on an initial real-world location of the camera and the determined first and second three-dimensional positions of the camera relative to the footprint in the scene at the time of capturing the image.

According to a second aspect, there is provided a computer implemented method, comprising: receiving a digital representation of an image of a scene captured using a camera, the scene comprising a footprint of a user; identifying the footprint in the image; identifying a first plurality of reference points each having a fixed position relative to the footprint in the image; identifying a second plurality of reference points each having a fixed position relative to a three-dimensional model of the user's foot constructed based on at least one known dimension of the user's foot; determining a transformation matrix by mapping the second plurality of reference points of the three-dimensional model to the first plurality of reference points; and determining, based on the transformation matrix, a three-dimensional position of the camera relative to the footprint in the scene at the time of capturing the image.

According to a third aspect, there is provided a computer-readable media storing computer-executable instructions configured to perform the above method.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

In general, the present invention relates to a novel technique for using the footprints of a user as a feature for localisation and tracking. In some embodiments, the footprints are thermal footprints of a user, which are generated due to a thermal difference between the ground areas, which have been in thermal contact with the user's feet, and the surrounding ground areas, which have not been in thermal contact with the user's feet and therefore not affected by the user's body temperature. The use of thermal footprints as a feature for localisation and tracking is advantages, as they are a feature generated by the user and are available in a variety of environments as long as there is a temperature difference between a person's body and the surrounding environment.

According to various embodiments, images of footprints in a scene are captured by a user-worn camera which could be mounted at any suitable position on a user to facilitate this, for example, on a helmet or Head-Mounted Display (HMD) or on the user's back. In some embodiments, the camera is monocular, i.e. a single camera. The use of a single camera as an image sensor in a localisation system is advantageous as it reduces manufacturing costs and reduces the size and weight of the system compared to conventional stereo vision cameras.

An image captured by the monocular camera is processed to identify and locate footprints on the images. A three-dimensional (3D) model of the user's footprint is constructed based on at least one dimension of the user's foot and a set of 3D reference points are identified on the 3D model. A corresponding set of two-dimensional (2D) reference points are then found on a footprint identified from the image. From the known correspondences between the sets of 2D and 3D points, standard algorithms, such as those for resolving the Perspective-n-Point (PnP) problem, can be used to estimate the position and orientation, or pose, of the camera relative to the footprint in the scene at the time of capturing the image. The pose of the camera can be used to estimate the pose of the user relative to the footprint in the scene at the time of capturing the image due to the known position and orientation of the camera relative to the user.

In some embodiments, by capturing a plurality of images of the user's footprints at different points in time, it is possible to track the user's movement relative to the ground on which the user's walking. Tracking may be initialised from an initial location with a known real-world coordinate. As the user moves away from the initial location, footprints are generated by the user. By capturing and performing processing these footprints, the user's new position relative to the initial location can be estimated and can be used to update the real-world location of the user.

The embodiments of the present invention can be used in any applicable environments, including environments where GPS and Wi-Fi based tracking is not available, such as indoors, undergrounds and areas with extreme weather conditions. It is also an advantageous system for tracking over wide areas or in emergencies where it is not possible to set up any infrastructure to facilitate tracking in advance, for example in situations involving dismounted soldiers on critical missions and first responders at the scene of an emergency. As the thermal footprints are user-generated and the camera is user-worn, the environment itself does not need to contain any distinctive content and there is no need to mount any cameras or markers in the environment prior to tracking. In addition, as the footprints are generated by the heat difference between the user and their environment, the embodiments of the invention could be applied regardless of whether the thermal footprints are colder or warmer than the user's surroundings.

In some embodiments, the tracking system may be augmented with additional sensors for localisation, for example, inertial sensors, GPS signal transceivers and Wi-Fi transceivers. These additional sensors could be used in combination with the camera in the system to improve accuracy of localisation. In some embodiments, optionally equipment may be provided to adjust the heat signature of the user's feet, for example, to generate more heat and provide a more pronounced thermal footprint.

The operation of some embodiments of the invention will be described herein with reference to FIGS. 1-11.

Figure 1:
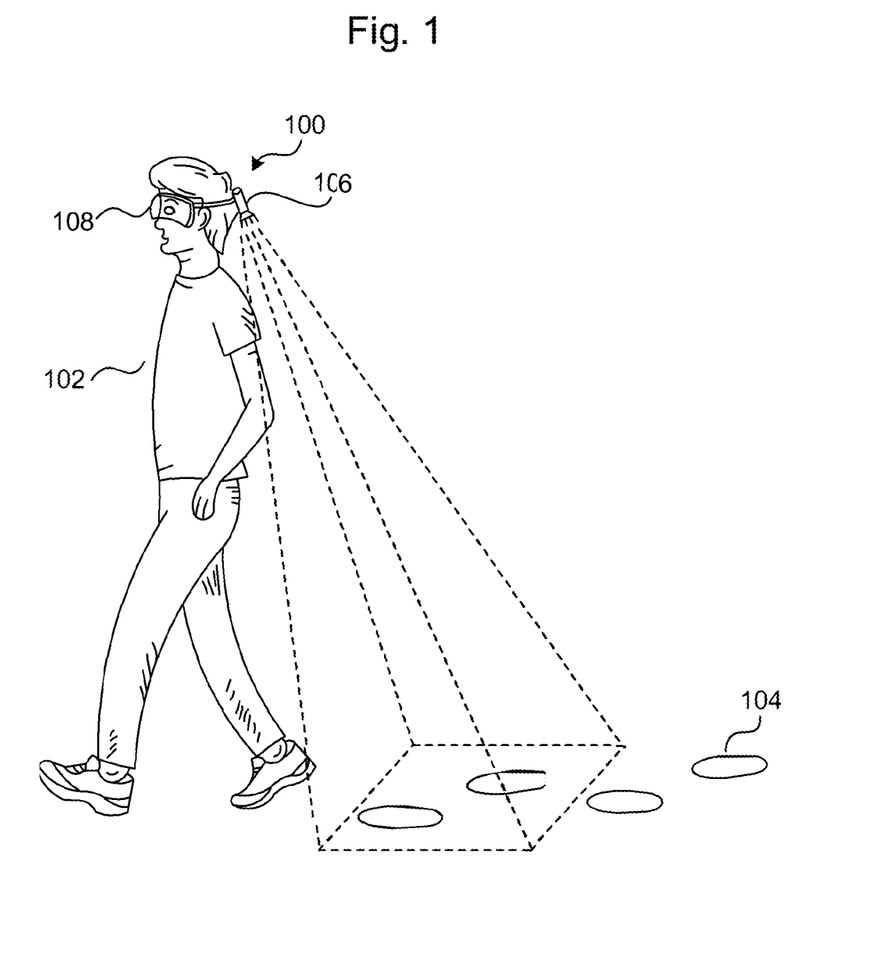
FIG. 1 illustrates an environment in which a system according to an embodiment of the present invention may be used.

FIG. 1 illustrates an environment in which an embodiment of the present invention may be used. While a user 102 walks on a ground, a number of footprints 104 are generated. In some embodiments, the footprints 104 may be thermal footprints. The thermal footprints are generated as a result of a thermal difference between the ground areas, which have temperatures affected by the user's body temperature and friction, and their surrounding ground areas, which have not been thermally affected by the user's body temperature. In other embodiments, the footprints 104 may be indentations formed by the user's feet on a sandy, muddy, moist or grassy ground, instead of thermal footprints.

The user 102 may use a system 100, which comprises an image sensing device 106 generally pointing to the ground for capturing images of the ground. In one embodiment, as shown in FIG. 1, the image sensing device 106 may be mounted on the back of the user's head and oriented to capture footprints 104 generated on the ground behind the user. In other embodiments, the image sensing device 106 may be positioned on the user's back or any other position on the user's body suitable for capturing the user's footprints 104. In some embodiments, the image sensing device 106 may be a thermal camera. In other embodiments, the image sensing device 106 may be an optical camera. In various embodiments, the image sensing device may be a monocular camera.

In some embodiments, the system 100 may optionally comprise a user-interface 108, which is operably coupled to the image sensing device 106. In some embodiments, the user-interface 108 and the image sensing device 106 may form a single device. For example, these devices may form parts of a head-mounted display or a helmet. In some embodiments, the user-interface 108 and the image sensing device 106 may be two separate devices. For example, the user-interface 108 may be a portable computing device (not shown in FIG. 1), such as a mobile phone, a tablet computer or a digital personal assistant, which is in operable communication with the image sensing device 106.

Figure 2:
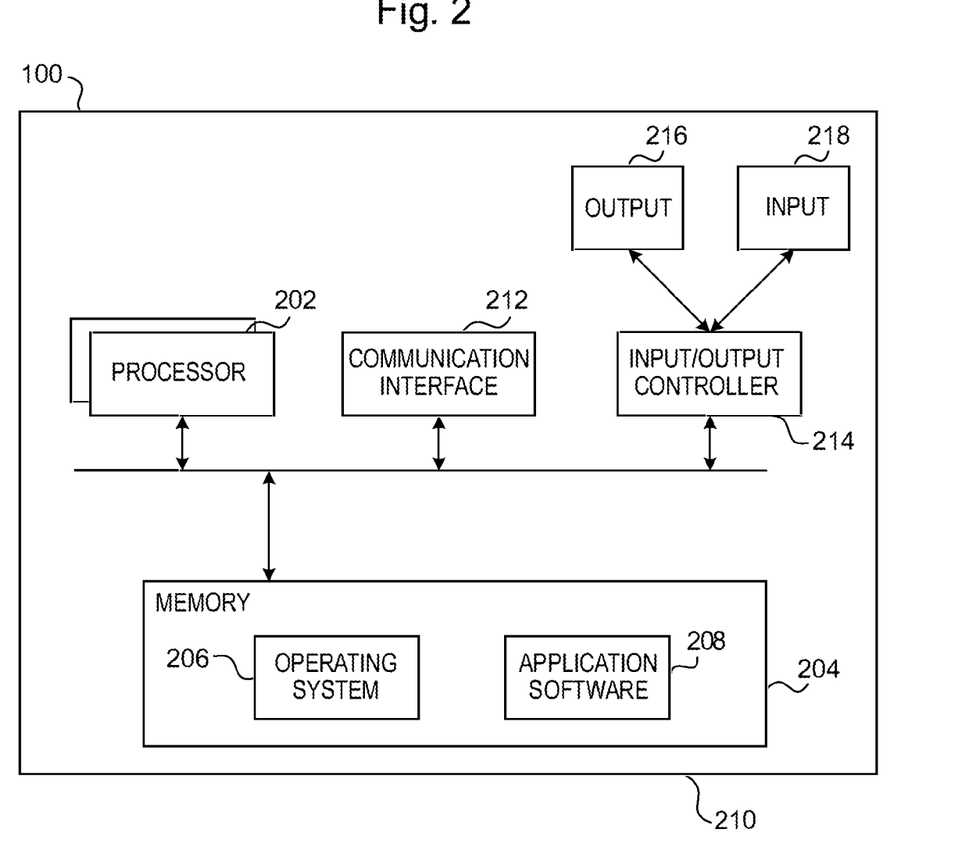
FIG. 2 is a block diagram of the components of a system according to an embodiment of the present invention.

FIG. 2 illustrates an exemplary set of components for system 100. The system 100 may be implemented as one or more computing and/or electronic devices. The system 100 comprises one or more processors 202 which may be micro-processors, controllers or any other suitable type of processors for processing computer executable instructions to control the operation of the system 100. Platform software comprising an operating system 206 or any other suitable platform software may be provided on the system to enable application software 208 to be executed on the system. In some embodiments, the application software 208 may comprise a software program for processing images, deriving data from the images, and processing the data derived from the images according to various methods described herein. The components of the system 100 described herein may be enclosed in one casing 210 as shown in FIG. 2 or more than one casing (not shown in FIG. 2).

Computer executable instructions may be provided using any computer-readable media that are accessible by the system 100. Computer-readable media may include, for example, computer storage media such as a memory 204 and communications media. Computer storage media, such as a memory 204, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. Although the computer storage medium (the memory 204) is shown within the system 100, it will be appreciated, by a person skilled in the art, that at least a part of the storage may be distributed or located remotely and accessed via a network or other communication link (e.g. using a communication interface 212).

The system 100 may comprise an input/output controller 214 arranged to receive and process an input from one or more input devices 218 which may be separate from or integral to the system 100 and arranged to output information to one or more output devices 216 which may be separate from or integral to the system 100. In some embodiments, the input devices 218 may comprise input devices for controlling the operation of the system 100, such as a set of buttons or keys. For example, the input devices 218 may comprise keys for controlling a camera, such as adjusting an orientation and/or a zoom of a camera, and/or for manipulating an image being displayed on a screen. The input devices 218 may also include suitable means for receiving a value from a user. In one embodiment, the value is a dimension and/or size of the user's foot. In some embodiments, the input devices 218 may include a remote control.

The input devices 218 may further comprise at least one sensing device. The at least one sensing device may include an image sensing device, such as a camera. In some embodiments, the camera is a thermal imaging camera. In other embodiments, the camera may be an optical camera. In various embodiments, the camera is monocular. In some embodiments, the at least one sensing device may additionally comprise an inertial sensor.

The output devices 216 may include a display screen. In one embodiment, the output device 216 may also act as an input device, for example, when the output device 216 is a touch screen. The input/output controller 214 may also output data to devices other than the output device, for example to a locally connected computing device, such as a smartphone. According to one embodiment, image processing and calculations based on data derived from images captured by the input device 218 and/or any other functionality as described in the embodiments, may be implemented by software or firmware, for example, the operating system 206 and the application software 208 working together and/or independently, and executed by the processor 202.

The communication interface 212 enables the system 100 to communicate with other devices and systems. The communication interface 212 may include GPS signal transceivers, Wi-Fi signal transceivers and/or Bluetooth™ transceivers.

The functionality described herein in the embodiments may be performed, at least in part, by one or more hardware logic components. According to an embodiment, the computing device 100 is configured by programs 206, 208 stored in the memory 204 when executed by the processor 202 to execute the embodiments of the operations and functionality described. Alternatively, or in addition, the functionality described herein may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Identifying Footprints on an Image

According to various embodiments, which will be described with reference to FIGS. 3 to 11, the input devices 218 of the system 100 comprise a thermal imaging camera 106 for capturing thermal images. The thermal imaging camera 106 may be a monocular camera. In operation, the thermal imaging camera 106 may be positioned and oriented on the user 102 for capturing footprints generated on the ground behind the user 102.

The operation of the system 100 begins with the thermal imaging camera capturing a thermal image. The thermal image may comprise at least one thermal footprint 104 of the user 100. The thermal footprints 104 may be identified via any suitable methods. An exemplary process for identifying possible footprints from a thermal image is described below.

Figure 3:
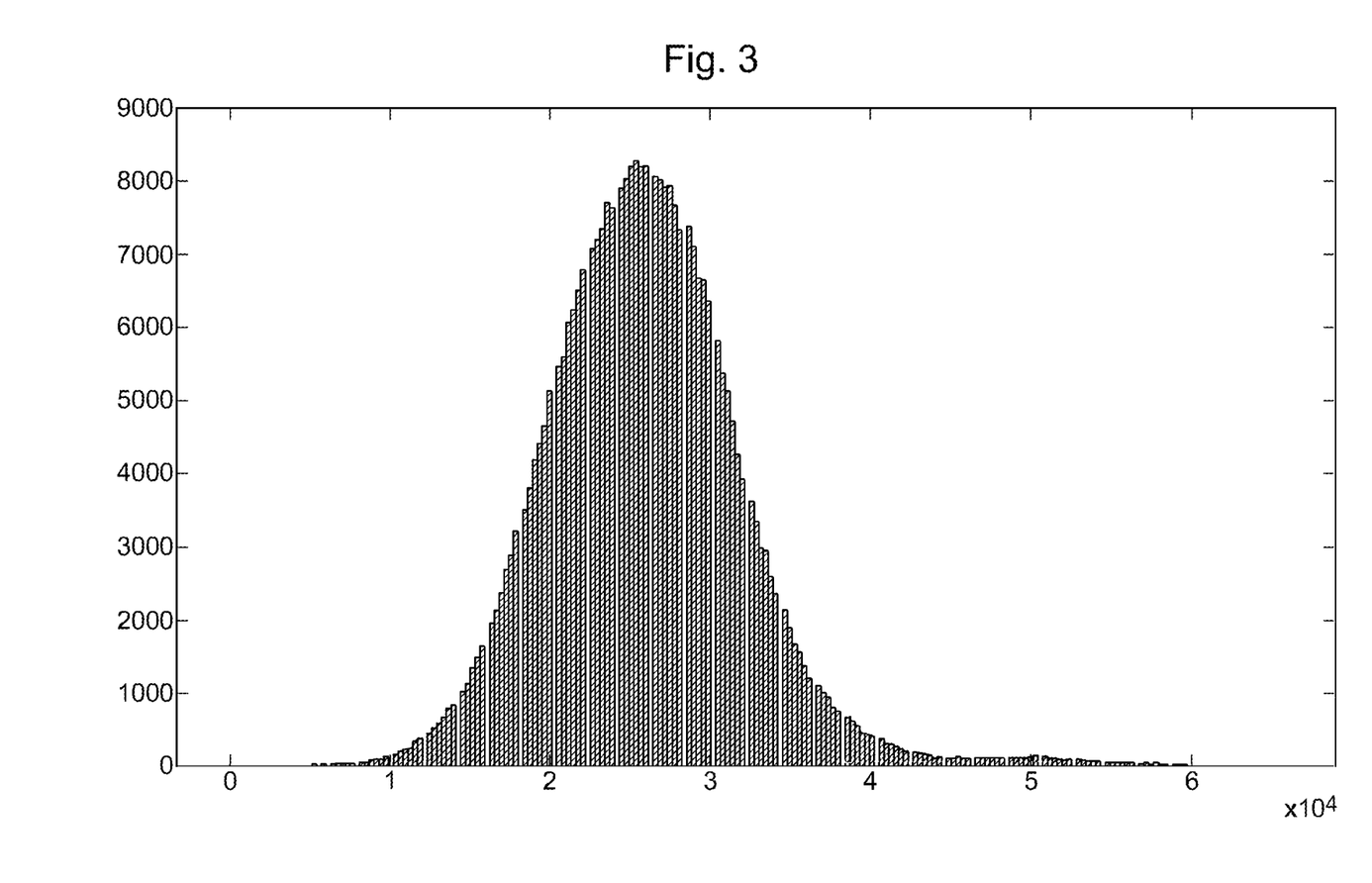
FIG. 3 is a histogram showing an exemplary statistical distribution of heat intensities of pixels in a thermal image according to one embodiment.

A thermal image comprises a two-dimensional array of pixels, each of which has a pixel value representing a thermal intensity at the respective pixel. FIG. 3 shows a histogram, which represents a statistical distribution of pixels at a range of thermal intensities for a captured thermal image. The x-axis of the graph in FIG. 3 represents thermal intensity, and the y-axis of the graph represents the number of pixels in the captured thermal image. Then the thermal intensity at which the highest number of pixels are present can be found from the histogram. This thermal intensity is around $2.5 \times 10^4$ in the case of FIG. 3. Then a number of thermal intensity thresholds are chosen such that they are generally evenly distributed around the thermal intensity at equal intervals. In the case of FIG. 3, the thermal intensity thresholds are chosen to be $1 \times 10^4$, $2 \times 10^4$, $3 \times 10^4$ and $4 \times 10^4$. Then at each thermal intensity threshold, the thermal image is filtered such that all pixels with a thermal intensity below the respective threshold are filtered out as noise. The filtered images at each of the four thermal intensity thresholds are shown in the upper half of FIG. 4.

Then in each of the filtered images, a contour may be fitted to each group of neighbouring pixels. The contours may be filled using any suitable methods. The contours may then be filtered by their areas, i.e. by the number of pixels within each contour, such that pixels within the contours, which have an area outside a predetermined range (e.g. 500-10,000 pixels in the case of FIG. 4), are filtered out as noise. This step filters out contours which are too big or too small to qualify as possible footprints.

Figure 4:
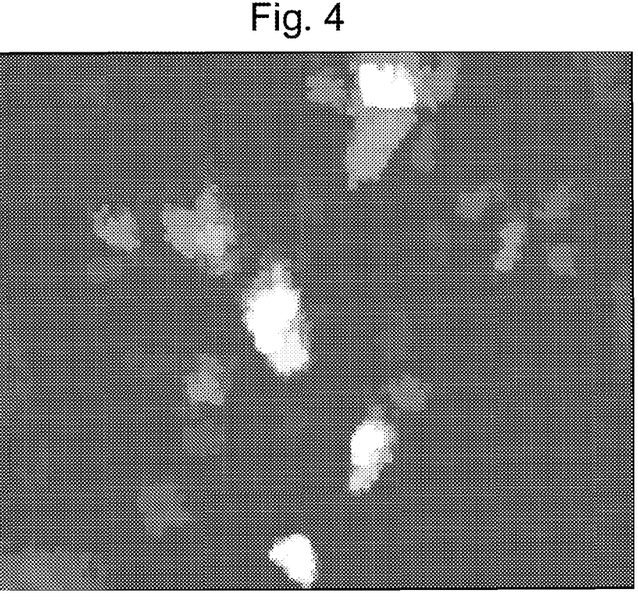
FIG. 4 shows exemplary results of filtering a captured thermal image at four different thermal intensity thresholds according to one embodiment.

Due to the shape of footprints and their similarity to ellipse shapes, ellipses are then fitted to the remaining contours as shown in FIG. 4. Although an ellipse shape is chosen here, other shapes which can approximate the actual shape of a user's foot may also be used.

As a result, each of the remaining groups of pixels in an image at a threshold have been provided with a corresponding contour and a corresponding ellipse. The contour is a closer approximation of the exact shape of a group of neighbouring pixels than the corresponding ellipse.

Then a set of parameters for assessing the probability that a group of pixels represent a footprint at each threshold may be calculated. In one example, the parameters may include one or more of the following: 1) the amount and/or proportion that a contour of the group of pixels fills in a corresponding ellipse, 2) the size of indentations formed between a contour and its corresponding ellipse, and 3) the extent to which a contour matches a corresponding ellipse. Then for an image at each thermal intensity threshold, the groups of pixels are further filtered based on the one or more of the above parameters, such that the groups of pixels, which best match an ellipse shape (i.e. the shape of a footprint), are chosen and the other groups of pixels are filtered out. The result is that for each thermal intensity threshold, a filtered image having the groups of pixels which represent locations of most probable footprints is produced.

A probability map can then be derived from a summation (or superposition) of the filtered images at the various thresholds. As shown in the probability map in FIG. 5, brighter areas indicate a higher probability of the presence of a footprint, and darker areas indicate a lower probability of a footprint being present.

The above only represents an exemplary process for identifying possible footprints from a captured image. Other suitable methods for identifying footprints from an image or a thermal image may be also used.

Optionally, in the next step, the most recent footprint(s), i.e. the footprint(s) located closest to the camera at the time of capturing the image, are identified.

Figure 5:
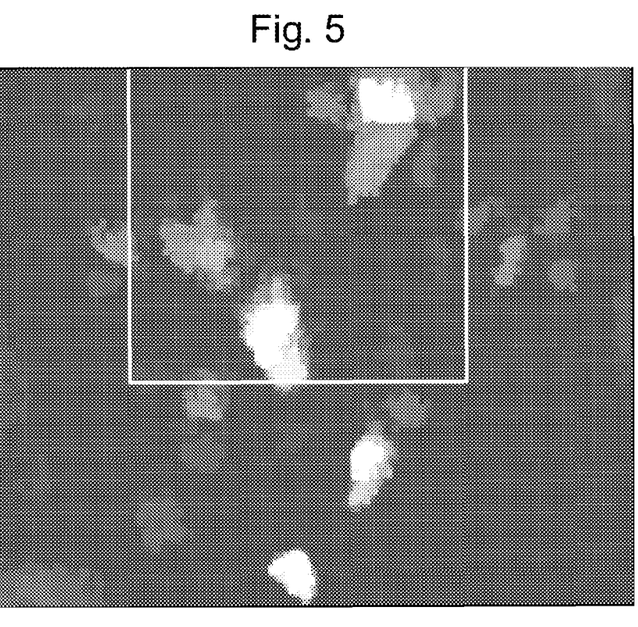
FIG. 5 shows an exemplary probability map illustrating the probability of thermal footprints being present at various locations of a thermal image according to one embodiment.
Figure 6:
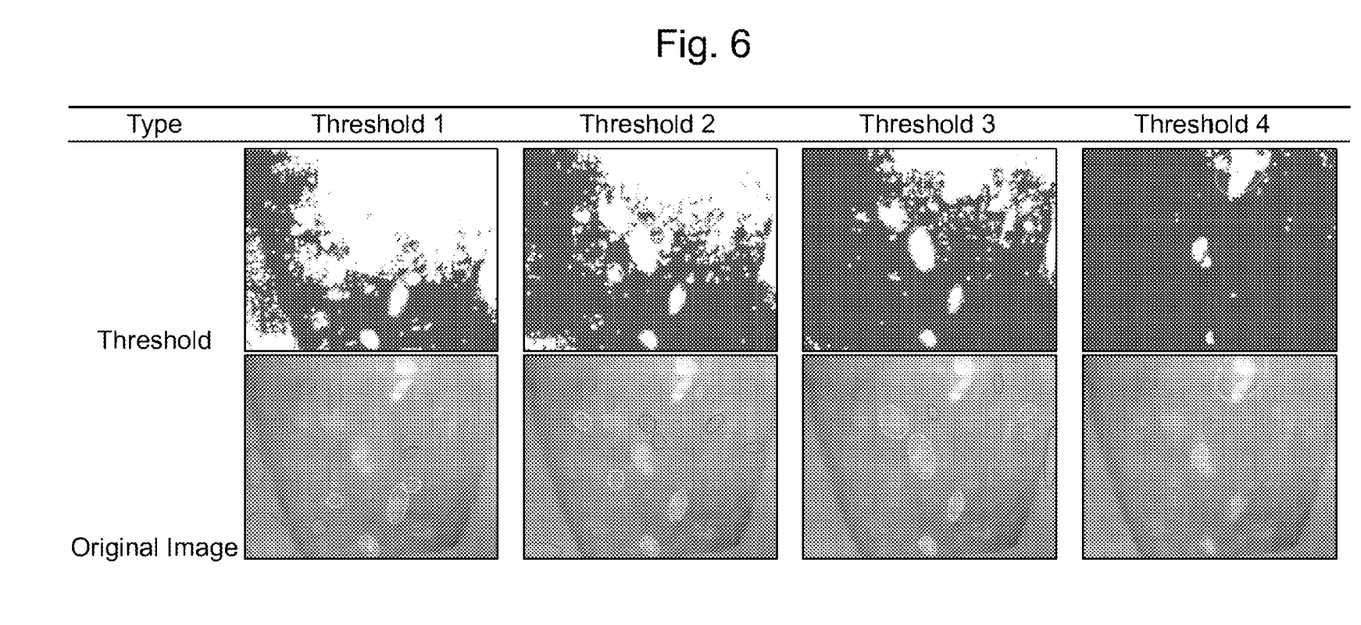
FIG. 6 illustrates an exemplary method for identifying the footprints located closest to a camera at the time of the image being captured by the camera according to one embodiment.

In the embodiment of this invention, as the location and orientation of the camera relative to the user is known, they can be used to identify the footprint(s) located closest to the camera at the time of capturing the image. As in operation the camera is positioned and oriented to capture images on the ground behind the user, if it is known that the upper side of the image of FIGS. 4-6 is proximal to the user when the image was captured, it can be derived that the most recent footprint(s) should be the one(s) located right below the top center of the captured image.

Figure 7:
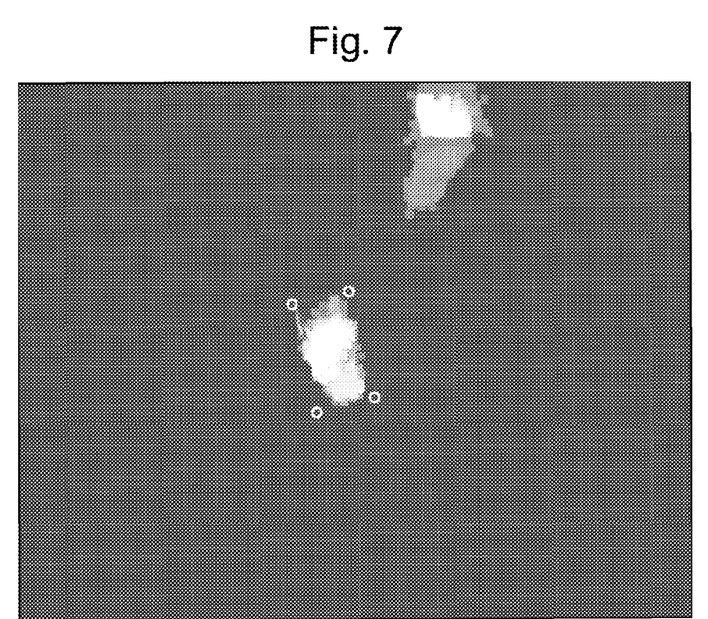
FIG. 7 illustrates an exemplary set of reference points for use in identifying a pose of a camera relative to a footprint according to one embodiment.
Figure 8:
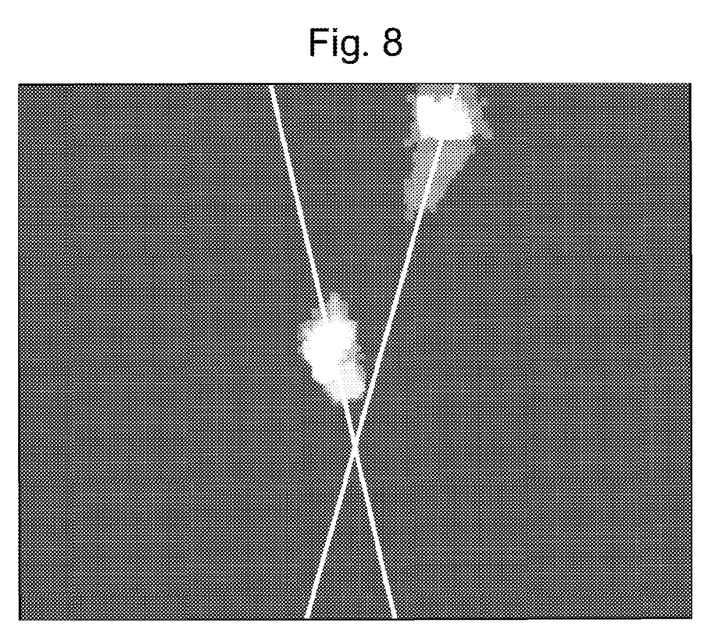
FIG. 8 illustrates lines indicating orientations of footprints identified in an image according to one embodiment.

Accordingly, an area can be created in the probability map in which the most recent footprint(s) are likely to be located. The upper side of this area should align with the upper side of the image. The shape and size of this area can be predefined in any suitable way. In the example of FIG. 6, the area has a rectangular shape and the dimensions of the rectangle may be empirical figures obtained experimentally. Then the groups of pixels which have the highest probability of representing footprints, i.e. the brightest groups of pixels, are identified in the rectangular area to be the most recent footprints at the time of capturing the image. The most recent footprints can be segmented as shown in FIGS. 7 and 8.

Optionally, the previous footprints, which are the footprints formed immediately before the most recent footprints, can also be identified based on the direction of a user's movement derived from the orientations of the footprints identified closest to the camera when the image was captured.

The orientation of a footprint can be identified by fitting the footprint to a geometrical shape, for example, a rectangle or an ellipse. In some embodiments, the most recent pair of footprints segmented from the image are fitted to rectangles. As shown in FIG. 8, a longitudinal axis for the rectangle fitted to each most recent footprint is calculated and is considered to represent the orientation of the respective footprint.

Figure 9:
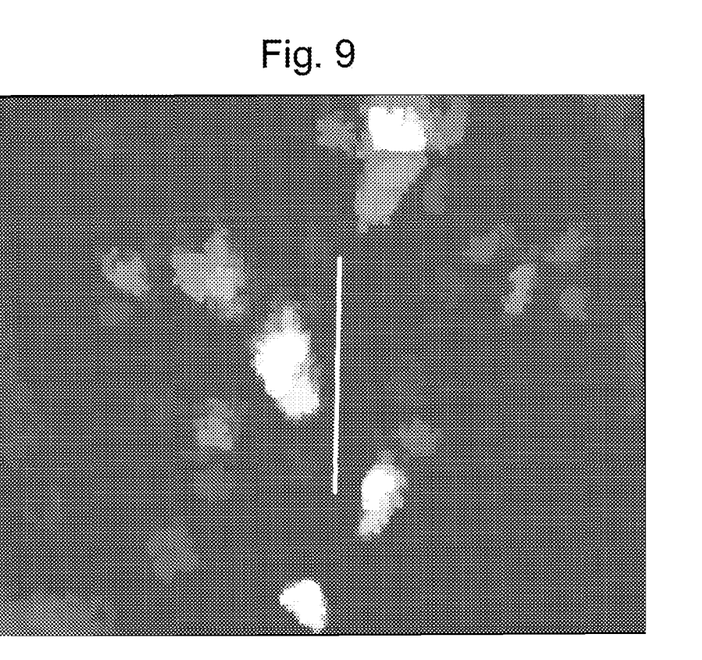
FIG. 9 illustrates an exemplary line segment indicating a direction of a user's movement according to one embodiment.

Then a bisecting line of the two longitudinal axes of the footprints is calculated. In one embodiment, the bisecting line is an internal angle bisector of the angle formed by the two longitudinal axes of the most recent footprints. The bisecting line represents the direction of the user's movement as shown in FIG. 9.

The bisecting line of the two longitudinal axes of the most recent pair of footprints identified on an image can be considered to indicate an orientation or pose of a user at the time of capturing the image. It can also be used for estimating the user's movement direction and predicting where the user will go next.

Figure 10:
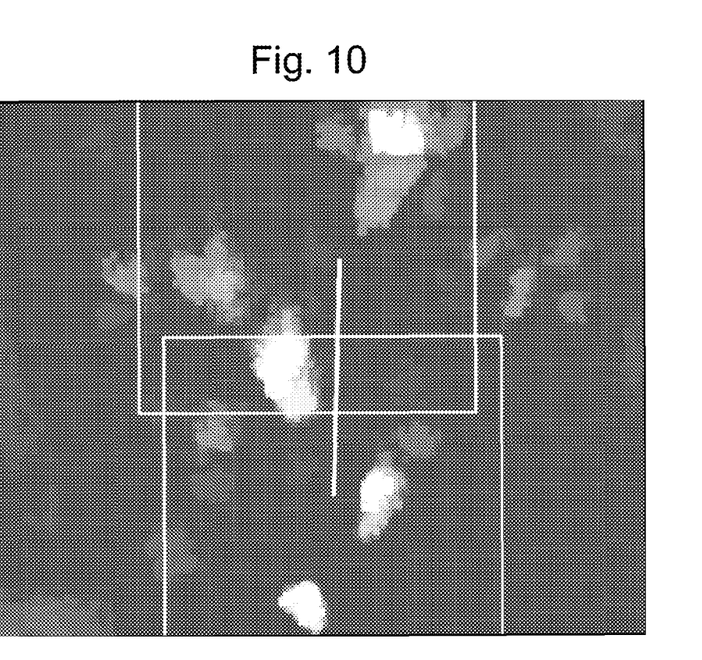
FIG. 10 illustrates an exemplary method for identifying the footprints generated immediately prior to those located closest to a camera at the time of the image being captured according to one embodiment.

As the user can be considered to generally move along the direction of the bisecting line, the bisecting line can be used to identify previous footprints formed before those identified closest to the camera at the time of capturing the image. A line segment of a predetermined length may be drawn along the bisecting line, as shown in FIGS. 9 and 10. The predetermined length may equal to a step size of a user. It may be an empirical value or a value provided or measured by a user. In one embodiment, the predetermined length is three times the length of the footprint identified closest to the camera while the image was captured. The end of the line segment proximal to the position of the camera can be located between the most recent pair of footprints, for example at the middle point of a line segment joining the centers of the most recent pair of footprints. The end of the line segment distal to the position of the camera can be used to center a second area, such as a second rectangle area as shown in FIG. 10. The shape and the dimensions of the second area may be predefined or calculated based on the user's foot size or in any suitable way. Then the previous footprints can be identified as those having the highest probability on the probability map (other than those already identified as the most recent footprints) in the second rectangle.

Figure 11:
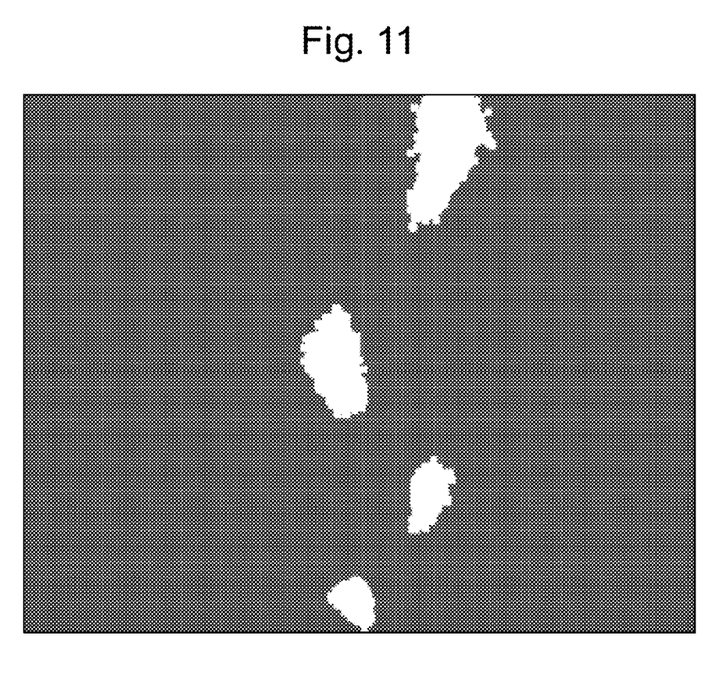
FIG. 11 illustrates a segmentation of all footprints identified from a thermal image according to one embodiment.

Optionally, the above process may be repeated (by using the bisecting line of the longitudinal axes of the second pair of footprints) to find further footprints on the thermal image, if there are any further footprints on the image. FIG. 11 shows the segmentation of all footprints identified on the captured image.

Determining a 3D Position of the Camera Relative to the Position of a Footprint in the Scene The position and orientation, or pose, of the camera relative to a footprint in the scene at the time of image capture can be estimated by solving a Perspective-n-Point (PnP) problem, which is the problem of estimating the pose of a camera given a set of 3D points in the world and their corresponding 2D projections on an image.

More specifically, the PnP problem is defined as given a set of n 3D points in a world reference frame and their corresponding 2D image projections as well as the calibrated intrinsic camera parameters, determining the 6 Degrees-of-Freedom (DOF) pose of the camera in the form of its rotation and translation with respect to the world. Mathematically, the PnP problem can be defined as:

$$s\, p_c = K[R|T]p_w \quad (1)$$

where $p_w = [x\ y\ z\ 1]^T$ is the 3D coordinates of the 3D reference points, $p_c = [u\ v\ 1]^T$ is the corresponding coordinates of the 2D reference points, K is the matrix of intrinsic camera parameters, s is a scale factor for the image point, and R and T are the 3D rotation and 3D translation of the camera that are being calculated. Then equation (1) can be expanded as:

$$s\begin{bmatrix} u \\ v \\ 1 \end{bmatrix} = \begin{bmatrix} f_x & \gamma & u_0 \\ 0 & f_y & v_0 \\ 0 & 0 & 1 \end{bmatrix} \begin{bmatrix} r_{11} & r_{12} & r_{13} & t_1 \\ r_{21} & r_{22} & r_{22} & t_2 \\ r_{31} & r_{32} & r_{33} & t_3 \end{bmatrix} \begin{bmatrix} x \\ y \\ z \\ 1 \end{bmatrix} \quad (2)$$

where $f_x$ and $f_y$ are the scaled focal lengths, $\gamma$ is the skew parameter which is sometimes assumed to be 0, and ($u_0$ $v_0$) is the principal point.

The footprint identified in the captured image can be considered to be a two-dimensional projection of the user's footprint. A three-dimensional model of the user's footprint can be constructed based on the real dimensions of the user's foot. A group of n reference points can be provided on the three-dimensional model. If a group of n corresponding reference points are identified on the two-dimensional projection (i.e. the identified footprint in the image), then the PnP problem can be solved to give an estimated position of the camera relative to the footprint in the scene at the time of image capture.

The three-dimensional model for the user's footprint can be constructed according to the real dimensions of the user's foot. In some embodiments, the three-dimensional model is an approximation of the shape of a user's foot. Any shape which approximates a human footprint can be chosen for the three-dimensional model. In one embodiment, a rectangular cuboid is chosen for the three-dimensional model of the user's footprint. The length and width of the rectangular cuboid can be set to be the length and width of the user's foot. As the rectangular cuboid represents a three-dimensional model of the user's footprint, it can be set to have a very small, negligible height. In one example, the height of the three-dimensional model is set to be one unit in equation (2) above. In one example, four corners of a rectangle formed by the length and width of the rectangular cuboid in the three-dimensional model are chosen as reference points. However, it would be possible to set other points on the three-dimensional model as the reference points.

Then corresponding reference points are identified on a footprint in the captured image, which is a two-dimensional projection of the footprint. A rectangle is fitted to the footprint identified in the captured image. As shown in FIG. 7, the four corners of the rectangle are chosen to be the reference points of the two-dimensional projection of the footprint, as they correspond to the four corners of the three-dimensional model of the footprint. The set of reference points of the two-dimensional projection have to correspond to the set of reference points on the three-dimensional model, such that the former set of points are a result of a two-dimensional projection of the latter set of points.

The camera matrix is also a known parameter. It can be predetermined by camera calibration. Any known camera calibration method suitable for determining the camera matrix can be used. In one example, the camera matrix can be obtained by calibrating the camera using a chessboard.

Therefore, in equation (1) above, $p_c$ can be derived from the reference points in the 3D model of the footprint, $p_w$ can be derived from the corresponding reference points in the 2D projection of the footprint on the captured image, and K can be determined by camera calibration. In one example, the scale factor s in equation (1) can be set to 1. Then the Rotation and Translation matrix [R|T], which represents the position and orientation of the camera relative to the footprint in the scene at the time of image capture, can be calculated using equation (1).

In the embodiments described above, both the length and the width of the user's foot are known and used to construct the three-dimensional model of the user's foot. However, in other embodiments, it could be that only one dimension, such as the length, of a user's foot is known, and the other dimension of the user's foot can be estimated using a predetermined ratio between the length and width of a human foot. The ratio may be an empirical ratio or a statistical value derived from measuring length-to-width ratios of a number of human feet.

To enhance accuracy in situations when the imaging based localisation system may not function accurately, for example in a crowded situation where many footprints from different people are overlapping one another, the system may be augmented with other sensors and tracking methods. For example, the pose obtained by the thermal footprint system could be combined with at least one of a pose obtained by a Simultaneous Localisation and Mapping (SLAM) system, information from inertial sensors, such as accelerometers, gyroscopes and/or magnetometers, and positions estimated from signals from dropped radio or Ultra Wide Band (UWB) beacons or existing wireless communication signals (e.g. Wi-Fi signals) in the environment.

As the position and orientation of the camera relative to the user is known, it is then possible to estimate the position and orientation of the user relative to a footprint in an image at the time of capturing the image. For example, it is possible to provide a transform of coordinates between the camera coordinates and user coordinates, so that the estimated position and orientation of the camera from the localisation system can be transformed into an estimated position and orientation for the user.

Tracking the Position of the Camera Relative to a Footprint in the Scene Over Time At a first point in time, by solving the PnP problem as described above, the Rotation and Translation matrix [R|T] for indicating the position and orientation of the camera relative to a particular footprint in the scene can be obtained. As the camera moves with the user over time, the position and orientation of the camera relative to the particular footprint identified in the scene also changes. Then subsequently, at a second point in time, a second Rotation and Translation matrix [R|T] for indicating the position and orientation of the camera relative to the particular footprint in the scene can be obtained. If $T_1$ designates the Rotation and Translation matrix [R|T] at the first point in time and $T_2$ designates the Rotation and Translation matrix [R|T] at the second point in time, then the inter-frame transformation matrix $T_{i(1,2)}$, which transforms the position and orientation of the camera relative to the particular footprint in the scene at the first point in time $T_1$ to the position and orientation of the camera at the second point in time $T_2$, can be calculated as follows:

as $T_1 \times T_{i(1,2)} = T_2$, it follows that $T_{i(1,2)} = T_1^{-1} \times T_2$ \hfill (3)

As the user and camera move further over time, the Rotation and Translation matrix [R|T] can be obtained at each of the subsequent points in time, and an inter-frame transformation matrix $T_i$ can be obtained for each pair of image frames captured at consecutive points in time. Then the total transformation matrix $T_{i\text{-}total}$ can be calculated as:

$T_{i(total)} = T_{i(1,2)} \times T_{i(2,3)} \times \ldots \times T_{i(n,n+1)}$ \hfill (4)

where $T_{i(n, n+1)}$ is the inter-frame transformation matrix between the images captured at the nth and (n+1)th points in time.

In order to determine the inter-frame transformation between images captured at consecutive points in time, optical flow methods may be used to track footprints, so that the Rotation and Translation matrix [R|T] can be obtained with respect to the same footprint on images captured at consecutive points in time. The Lucas-Kanade method is an example of an optical flow method for detecting and tracking an object present in multiple images taken at consecutive points in time.

The above process can be used together with dead-reckoning to track the real-world location of a user over time. The tracking may be initialised from the user's initial real-world location, which has a known real-world coordinate. The initial position and orientation may be obtained from, for example, GPS positioning, a nearby Wi-Fi hotspot and/or an application which could be used by the tracked person to "check in" with a known location.

As the user moves away from the initial location, footprints are generated by the user. The user's instantaneous real-world location can be updated using the relative position and orientation obtained from the footprint localisation system as described above. More specifically, this involves capturing images of the ground behind the user at different points in time, identifying footprints from the images, calculating the position and orientation of the camera relative to a footprint in the image captured at the each of the different points in time, determining an inter-frame transformation matrix $T_i$ for each pair of images captured at consecutive points in time, and hence determining the total transformation matrix $T_{i\text{-}total}$ over a time period according to the embodiment described above.

Over time, errors may accumulate in the system as the estimated positional information from the footprints is used to update the known initial position. To nullify errors, regular corrections may be provided to the system via GPS (when available), user check-ins or other localisation sensor information. This could either be used to overwrite the positional information from the footprint tracking system or could be combined with the position and orientation obtained from the footprint localisation system through the use of a statistical algorithm such as a Kalman filter.

In some embodiments where there is existing knowledge of the area (for example, a building floor plan or map is available), this information could be used to provide corrections to the output from the thermal footprint localisation system. Known restrictions on movement such as the locations of walls in the area could be used to rule out certain movements and provide adjustments if unlikely or impossible movements are returned from the tracker, such as a person walking through a wall.

In situations where the heat difference between the user's thermal footprint and the environment is not significant enough for reliable tracking, the system could optionally be augmented through the inclusion of a heat adjustment device in the user's shoe which adjusts the heat signature of their feet. The heat adjustment device may generate heat so as to provide a more pronounced thermal footprint and/or to provide a thermal footprint in a particular pattern. By providing heat to the user's shoe in a particular pattern, an identity can be applied to the thermal footprint to allow identification of the user's thermal footprints in an image filled with many other thermal footprints, e.g. in a situation when the user is in a crowd of other people.

In some embodiments, information from inertial sensors, such as accelerometers, gyroscopes and/or magnetometers, may be used to detect when the user has stopped moving, so that the system can maintain a currently detected position until the user resumes moving. This helps reduce processing overhead in locating the footprints and can lead to more accurate results than continuing to calculate new camera pose estimates, which may introduce additional errors whilst the user is not generating any new footprints.

As the camera-based localisation system described above depends on there being a clear Line of Sight (LOS) between the camera and the user's footprints, the system may occasionally suffer from occlusion if the LOS between the camera and the footprints is temporarily blocked, for example, by another person walking across the camera's field of view. Optionally, a use of tracking methods other than those using a camera as described above would enable switching to one or more of these other methods whilst obstruction is present. For example, in the event of occlusion between the camera and the ground when an image is captured, the system may switch to an inertial sensor based tracking method.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A system, comprising:
   a camera for capturing an image;
   at least one processor and at least one memory, the at least one memory storing instructions configured to cause the processor to
      receive an image of a scene captured by the camera, the scene comprising a footprint of a user of the system, identify the footprint in the image,
      identify a first plurality of reference points each having a fixed position relative to the footprint in the image,
      identify a second plurality of reference points each having a fixed position relative to a three-dimensional model of the user's foot constructed based on at least one known dimension of the user's foot,
      determine a transformation matrix by mapping the second plurality of reference points of the three-dimensional model to the first plurality of reference points, and
      determine, based on the transformation matrix, a three-dimensional position of the camera relative to the footprint in the scene at the time of capturing the image.

2. The system of claim 1, wherein the at least one memory stores instructions configured to cause the processor to determine a three-dimensional orientation of the camera relative to the footprint in the scene at the time of capturing the image.

3. The system of claim 1, wherein said image of the scene is a first image of the scene captured at a first point in time, wherein said transformation matrix is a first transformation matrix, and wherein the at least one memory stores instructions configured to cause the processor to:
   obtain a second image of the scene captured using the camera at a second point in time;
   identify the footprint in the second image;
   identify a third plurality of reference points each having a fixed position relative to the footprint in the second image;
   identify a fourth plurality of reference points each having a fixed position relative to the three-dimensional model of the user's foot constructed based on the at least one known dimension of the user's foot; and
   determine a second transformation matrix by mapping the fourth plurality of reference points of the three-dimensional model to the third plurality of reference points on the plane of the second image.

4. The system of claim 3, wherein the three-dimensional position of the camera is a first three-dimensional position of the camera relative to the footprint in the scene at the first point in time, and wherein the at least one memory stores instructions configured to cause the processor to:
   determine an inter-frame transformation matrix based on the first transformation matrix and the second transformation matrix; and
   determine, based on the inter-frame transformation matrix and the first three-dimensional position of the camera relative to the footprint in the scene, a second three-dimensional position of the camera relative to the footprint in the scene at the second point in time.

5. The system of claim 4, wherein the at least one memory stores instructions configured to cause the processor to calculate an updated real-world location of the camera based on an initial real-world location of the camera and the determined first and second three-dimensional positions of the camera relative to the footprint in the scene at the time of capturing the image.

6. The system of claim 5, wherein the at least one memory stores instructions configured to cause the processor to calculate the updated real-world location of the camera based on at least one of: known knowledge of the area where the user is located, a Simultaneous Localisation and Mapping (SLAM) system, at least one inertial sensor, magnetic sensor, signals emitting beacons, wireless communication signals, Signals of Opportunity, user designated position, or a GPS signal.

7. The system of claim 1, wherein the camera is monocular.

8. The system of claim 1, wherein the at least one memory stores instructions configured to cause the processor to determine a direction of the at least one footprint in the image by determining a longitudinal axis of the at least one footprint.

9. The system of claim 1, wherein the camera is a thermal imaging camera, and wherein the image is a thermal image.

10. The system of claim 9, comprising a heat adjustment device for adjusting a thermal footprint of the user.

11. The system of claim 1, wherein the camera is a camera for capturing visible light.

12. The system of claim 1, wherein the at least one known dimension of the user's foot comprises at least a length or a width of the user's foot.

13. The system of claim 1, comprising a Head-Mounted Display, to which the camera is operatively coupled, or a helmet, on which the camera is configured to be positioned.

14. A computer implemented method, comprising:
   receiving a digital representation of an image of a scene captured using a camera, the scene comprising a footprint of a user;
   identifying the footprint in the image;
   identifying a first plurality of reference points each having a fixed position relative to the footprint in the image;
   identifying a second plurality of reference points each having a fixed position relative to a three-dimensional model of the user's foot constructed based on at least one known dimension of the user's foot;
   determining a transformation matrix by mapping the second plurality of reference points of the three-dimensional model to the first plurality of reference points; and determining, based on the transformation matrix, a three-dimensional position of the camera relative to the footprint in the scene at the time of capturing the image.

15. The method of claim 14, comprising determining a three-dimensional orientation of the camera relative to the footprint in the scene at the time of capturing the image.

16. The method of claim 14, wherein said image of the scene is a first image of the scene captured at a first point in time, wherein said transformation matrix is a first transformation matrix, and wherein the method comprises:
    obtaining a second image of the scene captured using the camera at a second point in time;
    identifying the footprint in the second image;
    identifying a third plurality of reference points each having a fixed position relative to the footprint in the second image;
    identifying a fourth plurality of reference points each having a fixed position relative to the three-dimensional model of the user's foot constructed based on the at least one known dimension of the user's foot; and
    determining a second transformation matrix by mapping the fourth plurality of reference points of the three-dimensional model to the third plurality of reference points on the plane of the second image.

17. The method of claim 16, wherein the three-dimensional position of the camera is a first three-dimensional position of the camera relative to the footprint in the scene at the first point in time, and wherein the method comprises:
    determining an inter-frame transformation matrix based on the first transformation matrix and the second transformation matrix, and
    determining, based on the inter-frame transformation matrix and the first three-dimensional position of the camera relative to the footprint in the scene, a second three-dimensional position of the camera relative to the footprint in the scene at the second point in time.

18. The method of claim 17, comprising calculating an updated real-world location of the camera based on an initial real-world location of the camera and the determined first and second three-dimensional positions of the camera relative to the footprint in the scene at the time of capturing the image.

19. One or more non-transitory machine-readable mediums storing computer-executable instructions that when executed by one or more processors cause a process to be carried out, the process comprising:
    receiving a digital representation of an image of a scene captured using a camera, the scene comprising a footprint of a user;
    identifying the footprint in the image;
    identifying a first plurality of reference points each having a fixed position relative to the footprint in the image;
    identifying a second plurality of reference points each having a fixed position relative to a three-dimensional model of the user's foot constructed based on at least one known dimension of the user's foot;
    determining a transformation matrix by mapping the second plurality of reference points of the three-dimensional model to the first plurality of reference points; and
    determining, based on the transformation matrix, a three-dimensional position of the camera relative to the footprint in the scene at the time of capturing the image.

20. The one or more non-transitory machine-readable mediums of claim 19, the process comprising determining a three-dimensional orientation of the camera relative to the footprint in the scene at the time of capturing the image.

\* \* \* \* \*